United States Patent
Soga et al.

(10) Patent No.: US 7,152,968 B2
(45) Date of Patent: Dec. 26, 2006

(54) IMAGE FORMATION METHOD

(75) Inventors: Mamoru Soga, Osaka (JP); Hidekazu Arase, Hyogo (JP); Masaichiro Tatekawa, Osaka (JP); Keishi Taniguchi, Shizuoka (JP); Tsutomu Matsuda, Tokyo (JP); Masashi Ito, Shizuoka (JP); Takamichi Enomoto, Kanagawa (JP)

(73) Assignees: Matsushita Electric Industrial Co., Ltd., Osaka (JP); Ricoh Co., Ltd., Tokyo (JP)

( * ) Notice: Subject to any disclaimer, the term of this patent is extended or adjusted under 35 U.S.C. 154(b) by 185 days.

(21) Appl. No.: 10/457,972

(22) Filed: Jun. 10, 2003

(65) Prior Publication Data

US 2004/0041890 A1 Mar. 4, 2004

(30) Foreign Application Priority Data

Jun. 10, 2002 (JP) ............................. 2002-168258

(51) Int. Cl.
*G01D 11/00* (2006.01)
*B41J 2/17* (2006.01)

(52) U.S. Cl. ..................... 347/100; 347/95; 347/96

(58) Field of Classification Search ................ 347/100, 347/96, 98, 101, 105, 95, 103; 428/195, 428/32.1; 106/31.6, 31.13, 31.27; 523/160
See application file for complete search history.

(56) References Cited

U.S. PATENT DOCUMENTS

| 6,264,730 B1 | 7/2001 | Matsumura et al. |
| 2002/0069789 A1* | 6/2002 | Katsuragi et al. ......... 106/31.27 |
| 2003/0064206 A1* | 4/2003 | Koyano et al. ............. 428/195 |
| 2003/0068475 A1* | 4/2003 | Ohbayashi et al. ......... 428/195 |
| 2004/0110867 A1* | 6/2004 | McCovick ................... 523/160 |

FOREIGN PATENT DOCUMENTS

| EP | 940456 A1 * | 9/1999 |
| JP | 10-212439 | 8/1998 |
| JP | 11-293167 | 10/1999 |
| JP | 11-315231 | 11/1999 |
| JP | 2000-178494 | 6/2000 |
| WO | WO 99/64249 * | 12/1999 |

* cited by examiner

*Primary Examiner*—Manish S. Shah
(74) *Attorney, Agent, or Firm*—Harness, Dickey & Pierce, P.L.C.

(57) ABSTRACT

An ink composition containing a colorant, a humectant, water, and a water-soluble substance that begins to be condensation-polymerized as the water evaporates is ejected such that drops of the ink composition are adhered onto a print material 41 whose surface is acidic, whereby an image is formed on the print material 41.

9 Claims, 3 Drawing Sheets

IMAGE FORMATION METHOD

BACKGROUND OF THE INVENTION

1. Field of the Invention

The present invention falls within the technical field that relates to an image formation method based on so-called inkjet recording.

2. Description of the Prior Art

Conventionally, ink containing a colorant (dye or pigment), a humectant and water has been well known as ink used for inkjet recording. However, in the case of forming an image with the ink on a recording medium, the water-resistivity of the image is a matter of concern, i.e., there is a problem such that the colorant exudes into water when the image is exposed to water. Especially when an image is recorded on plain paper, the water-resistivity of the image is very poor. (The "plain paper" herein refers to paper which is one of various types of commercially-available paper, which is especially used for an electrophotographic copying machine, and which is produced without an intention to have an optimum structure, composition, properties, or the like, for inkjet recording.)

In Japanese Unexamined Patent Publication No. 10-212439, Japanese Unexamined Patent Publication No. 11-293167, Japanese Unexamined Patent Publication No. 11-315231, and Japanese Unexamined Patent Publication No. 2000-178494, adding a hydrolyzable silane compound (organic silicon compound) to ink in order to improve the water-resistivity of an image formed with the ink on a recording medium has been proposed. When a drop of such ink containing a silane compound is adhered on a recording medium, and a water content (solvent) of the ink drop evaporates or permeates into the recording medium, the silane compound remaining on the recording medium is condensation-polymerized, and this condensation-polymerized silane compound encloses a colorant. As a result, even when the image formed on the recording medium is exposed to water, the colorant is prevented from exuding into the water.

However, in the case where an ink drop is adhered onto a material to be printed by simply ejecting ink which contains the hydrolyzable silane compound proposed in the above publications based on a conventional inkjet recording method, condensation-polymerization of the hydrolyzable silane compound does not much quickly proceed. Accordingly, the colorant is not sufficiently enclosed by the hydrolyzable silane compound. This is especially the case when the ink containing a magenta dye is employed.

That is, an effect of the silane compound, i.e., an effect of providing high water-resistivity, cannot be sufficiently obtained in the ink of the above conventional example. Thus, there is a room to improve the water-resistivity of the conventional ink.

SUMMARY OF THE INVENTION

The present invention was conceived in view of the above problems. An objective of the present invention is to improve a method for forming an image on a material to be printed (print material) by ejecting ink containing a water-soluble substance that is condensation-polymerized as water evaporates, such as a hydrolyzable silane compound, based on an inkjet recording method, for the purpose of more securely obtaining high water-resistivity which is achieved with the water-soluble substance.

An image formation method of the present invention is a method for forming an image with an ink composition on a print material.

This method includes a step of ejecting an ink composition containing a colorant, a humectant, water, and a water-soluble substance that begins to be condensation-polymerized as the water evaporates; and a step of allowing the ejected ink composition to be adhered onto an acidic surface of the print material.

According to such a structure of the present invention, when an ink drop is adhered onto the print material, the water-soluble substance contained in the ink composition begins to be condensation-polymerized as water evaporates. In this process, the condensation-polymerization of the water-soluble substance is accelerated due to a catalytic effect of the acid present on the print material, so that the condensation-polymerization reaction is completed. As a result, a product of the condensation-polymerization of the water-soluble substance securely encloses the colorant. Thus, the water-resistant effect achieved with the water-soluble substance is obtained in the image more securely.

The print material may be plain paper. The "plain paper" herein includes paper which is one of various types of commercially-available paper, which is especially used for an electrophotographic copying machine, and which is produced without an intention to have an optimum structure, composition, properties, or the like, for inkjet recording.

According to a conventional image formation method, it is difficult to achieve sufficient water-resistivity in an image which is formed on plain paper with water-based ink. On the other hand, an image formation method of the present invention achieves high water-resistivity even in an image formed on plain paper.

The pH value of the surface of the print material may be 1–6. This is because an expected effect which can be achieved by an acid, i.e., an effect of accelerating condensation-polymerization of the water-soluble substance, is not obtained when the pH value of the surface of the print material is higher than 6. When the pH value of the surface of the print material is lower than 1, the print material itself is deteriorated, or an element of a recording apparatus which comes in contact with the print material is deteriorated.

The water-soluble substance may be a hydrolyzable silane compound. The silane compound is preferable in view of improvement of the water-resistivity. The water-resistivity of an image can be improved by adding a silane compound to an ink composition.

Another image formation method of the present invention is a method that uses an ink composition for inkjet recording, which contains a colorant, a humectant, water, and a water-soluble substance that begins to be condensation-polymerized as the water evaporates.

This method includes: a step of ejecting the ink composition from a nozzle toward a print material to form an image on the print material; and after the ejection step, a step of bringing the image formed on the print material into contact with an acid.

Still another image formation method of the present invention is a method that uses an ink composition for inkjet recording, which contains a colorant, a humectant, water, and a water-soluble substance that begins to be condensation-polymerized as the water evaporates.

This method includes: a step of bringing a print material into contact with an acid in advance; and after the contact step, a step of ejecting the ink composition from a nozzle toward the print material to form an image on the print material.

DESCRIPTION OF THE PREFERRED EMBODIMENTS

---Structure of Recording Apparatus--

Figure 1:
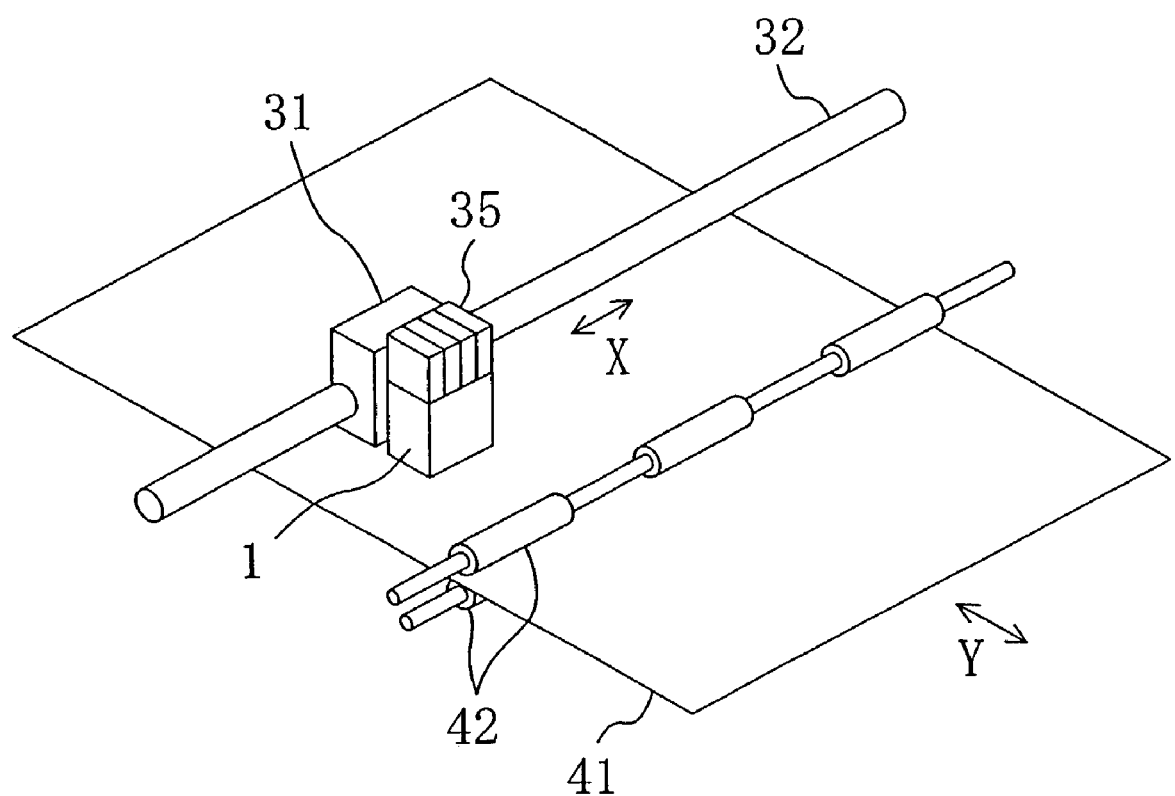
FIG. 1 is a general perspective view showing an inkjet-type recording apparatus according to an embodiment of the present invention.

FIG. 1 generally shows an inkjet-type recording apparatus A including an ink composition for inkjet recording according to an embodiment of the present invention. The recording apparatus A has an inkjet head 1. The inkjet head 1 ejects the ink onto a material to be printed, 41, in a manner described later. (Hereinafter, the "material to be printed" is referred to as "print material") On the upper surface of the inkjet head 1, an ink cartridge 35 including the ink is attached.

The inkjet head 1 is fixedly supported by a carriage 31. The carriage 31 is provided with a carriage motor (not shown). The inkjet head 1 and the carriage 31 are reciprocated by the carriage motor along a major scanning direction (X direction in FIGS. 1 and 2) while being guided by a carriage shaft 32 that extends along the major scanning direction.

The print material 41 is sandwiched by two transfer rollers 42 which are rotated by a transfer motor (not shown). Under the inkjet head 1, the print material 41 is transferred by the transfer motor and transfer rollers 42 along the minor scanning direction which is perpendicular to the major scanning direction (Y direction in FIGS. 1 and 2).

As described above, the recording apparatus A is structured such that the inkjet head 1 and the print material 41 are relatively moved with respect to each other by the carriage 31, the carriage shaft 32 and the carriage motor, and the transfer rollers 42 and the transfer motor.

Figure 2:
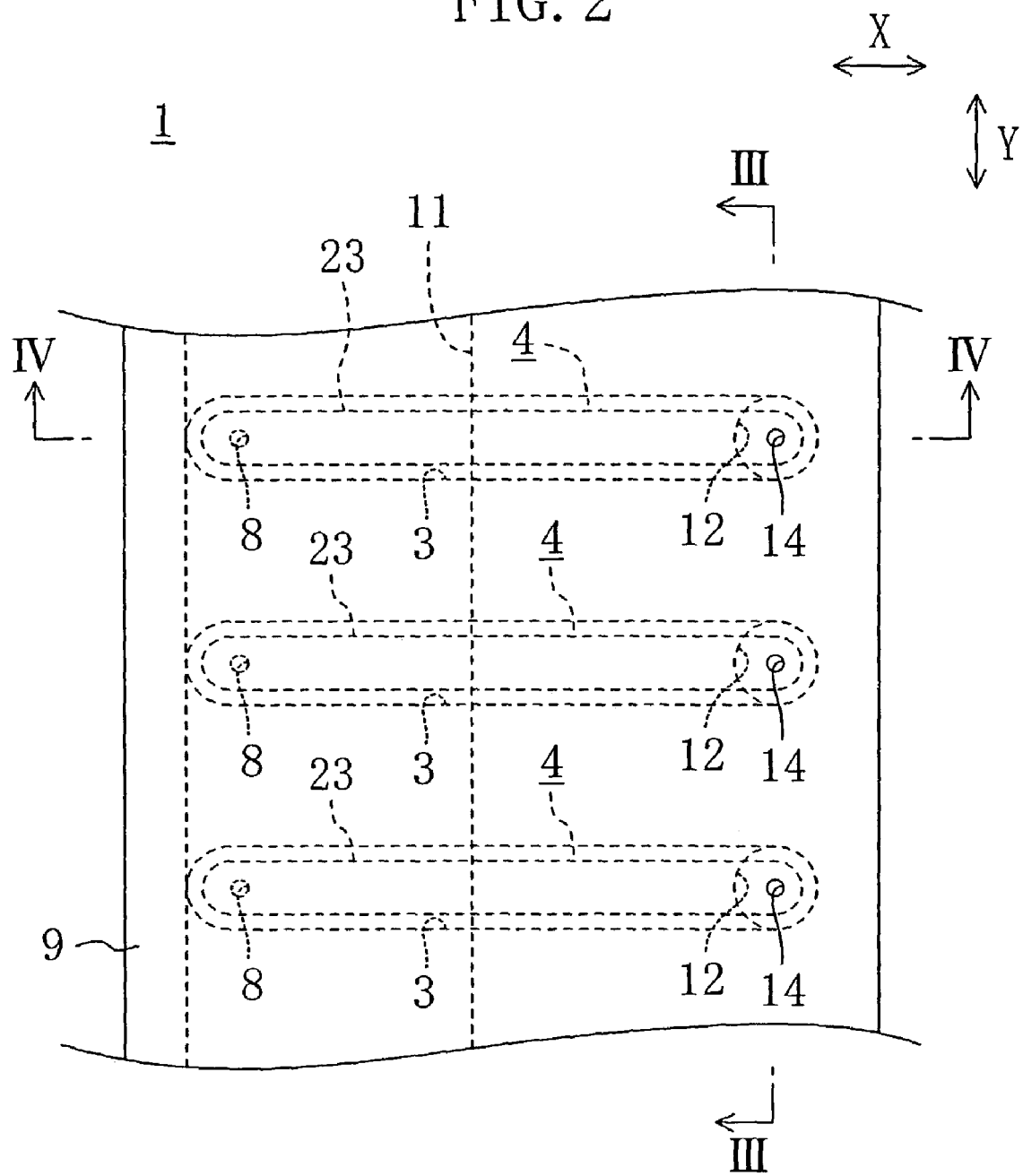
FIG. 2 shows a portion of a bottom surface of an inkjet head of the inkjet-type recording apparatus.
Figure 3:
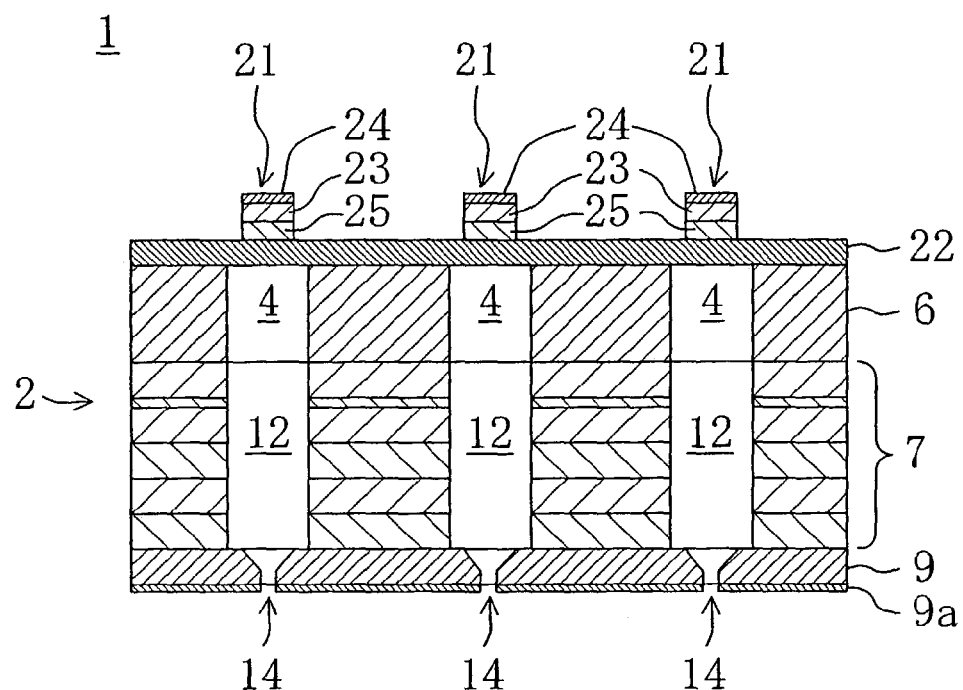
FIG. 3 is a cross-sectional view taken along line III—III of FIG. 2.
Figure 4:
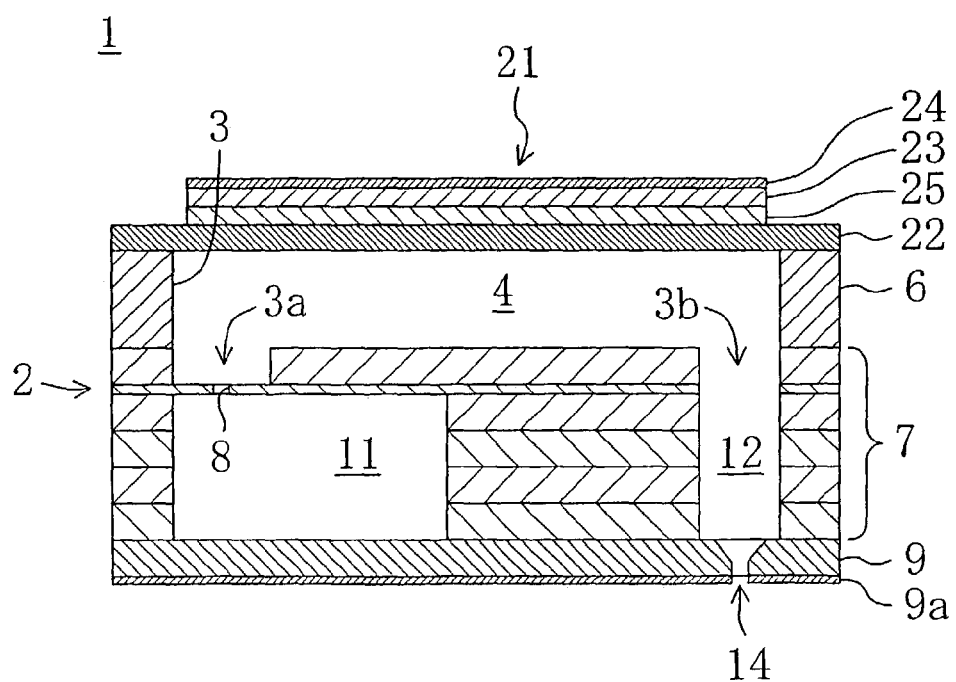
FIG. 4 is a cross-sectional view taken along line IV—IV of FIG. 2.

Referring to FIGS. 2 through 4, the inkjet head 1 includes a head main body 2. The head main body 2 has a plurality of concaved portions 3 for pressure rooms. Each of the concaved portions 3 of the head main body 2 has a supply hole 3a for supplying ink and an ejection hole 3b for ejecting the ink. The concaved portions 3 are opened in the upper surface of the head main body 2 such that the openings extend along the major scanning direction, and arranged along the minor scanning direction with generally-equal intervals therebetween. The length of the opening of each concaved portion 3 is set to about 1250 μm, and the width thereof is set to about 130 μm. Opposite ends of the opening of each concaved portion 3 have a generally-semicircular shape.

A side wall of each concaved portion 3 is formed by a pressure room member 6 made of photosensitive glass having a thickness of about 200 μm. A bottom wall of each concaved portion 3 is formed by an ink passage member 7 which is adhesively fixed onto the lower surface of the pressure room member 6. The ink passage member 7 is a laminate of six thin plates of stainless steel. The ink passage member 7 has a plurality of orifices 8, one ink supply passage 11, and a plurality of ink ejection passages 12. Each of the orifices 8 is connected to the supply hole 3a of a corresponding one of the concaved portions 3. The ink supply passage 11 extends along the minor scanning direction and is connected to the orifices 8. Each of the ink ejection passages 12 is connected to the ejection hole 3b of a corresponding one of the concaved portions 3.

Each orifice 8 is formed in the thin stainless steel plate which is the second from the top of the ink passage member 7, and whose thickness is smaller than the others. The diameter of the orifice 8 is set to about 38 μm. The ink supply passage 11 is connected to the ink cartridge 35, such that the ink is supplied from the ink cartridge 35 into the ink supply passage 11.

A nozzle plate 9 made of stainless steel is adhesively fixed onto the lower surface of the ink passage member 7. The nozzle plate 9 has a plurality of nozzles 14 for ejecting ink drops toward the print material 41. The lower surface of the nozzle plate 9 is covered with a water-repulsive film 9a. The nozzles 14 are aligned in a row on the lower surface of the inkjet head 1 along the minor scanning direction. The nozzles 14 are connected to the ink ejection passages 12 so as to have a communication with the ejection holes 3b of the concaved portions 3 through the ink ejection passages 12. Each nozzle 14 includes a tapered portion, where the nozzle diameter gradually decreases along a direction toward a nozzle tip side, and a straight portion provided at the nozzle tip side of the tapered portion. The nozzle diameter of the straight portion is set to about 20 μm.

Piezoelectric actuators 21 are provided above the concaved portions 3 of the head main body 2. Each of the piezoelectric actuators 21 has a diaphragm 22 made of Cr. The diaphragm 22 is adhesively fixed onto the upper surface of the head main body 2 so as to cover the concaved portions 3 of the head main body 2, such that the diaphragm 22 and the concaved portions 3 form pressure rooms 4. The diaphragm 22 is made of a single plate which is commonly used for all of the actuators 21. The diaphragm 22 also functions as a common electrode which is commonly used for all of piezoelectric elements 23 (described later).

Each piezoelectric actuator 21 has a piezoelectric element 23 made of lead zirconate titanate (PZT) and an individual electrode 24 made of Pt. On a surface of the diaphragm 22 which is opposite to the pressure room 4 (i.e., the upper surface of the diaphragm 22), an intermediate layer 25 made of Cu is provided at a portion of the surface which corresponds to the pressure room 4 (a portion above the opening of the concaved portion 3), and the piezoelectric element 23 is provided on the intermediate layer 25. The individual electrode 24 is bonded onto a surface of the piezoelectric element 23 which is opposite to the diaphragm 22 (i.e., the upper surface of the piezoelectric element 23). Each individual electrode 24 functions together with the diaphragm 22 to apply a voltage (driving voltage) to a corresponding one of the piezoelectric elements 23.

All of the diaphragm 22, the piezoelectric elements 23, the individual electrodes 24 and the intermediate layers 25 are formed of thin films. The thickness of the diaphragm 22 is set to about 6 μm. The thickness of each piezoelectric element 23 is set to 8 μm or smaller (e.g., about 3 μm). The thickness of each individual electrode 24 is set to about 0.2 μm. The thickness of each intermediate layer 25 is set to about 3 μm.

Each piezoelectric actuator 21 applies a driving voltage to the piezoelectric element 23 through the diaphragm 22 and the individual electrode 24, thereby deforming a portion of the diaphragm 22 which corresponds to the pressure room 4 (a portion of the diaphragm 22 at the opening of the concaved portion 3). As a result of the deformation of the diaphragm 22, the ink in the pressure room 4 is ejected from the nozzle 14 through the ejection hole 3b. That is, when a pulse-shaped voltage is applied between the diaphragm 22 and the individual electrode 24, the piezoelectric element 23 shrinks in the width direction of the piezoelectric element 23, which is perpendicular to the thickness direction thereof, in response to a rising edge of the pulse voltage because of a piezoelectric effect. On the other hand, the diaphragm 22, the individual electrode 24 and the intermediate layer 25 do not shrink even when the pulse voltage is applied. As a result, a portion of the diaphragm 22 which corresponds to the pressure room 4 is flexibly deformed into the shape of a convex toward the pressure room 4 because of a so-called bimetal effect. This flexible deformation increases the pressure inside the pressure room 4, and because of this increased pressure, the ink in the pressure room 4 is squeezed out of the nozzle 14 through the ejection hole 3b and the ink ejection passages 12. Then, the piezoelectric element 23 expands in response to a falling edge of the pulse voltage so that the portion of the diaphragm 22 which corresponds to the pressure room 4 recovers its original shape. At this time, the ink squeezed out of the nozzle 14 is separated from the ink remaining in the ink ejection passage 12, whereby the separated ink is released as an ink drop (e.g., 3 pl) toward the print material 41. The released ink drop adheres onto the print material 41 in the form of a dot. On the other hand, when the diaphragm 22 flexibly deformed in the shape of a convex recovers its original shape, the pressure room 4 is charged with ink supplied from the ink cartridge 35 through the ink supply passage 11 and the supply hole 3a. The pulse voltage applied to the piezoelectric elements 23 is not limited to the voltage of push-up/pull-down type as described above, but may be a voltage of pull-down/push-up type which falls from the first voltage to the second voltage that is lower than the first voltage and then rises to the first voltage.

The application of the driving voltage to each piezoelectric element 23 is performed at a predetermined time interval (for example, about 50 μm: driving frequency=20 kHz) while the inkjet head 1 and the carriage 31 are moved from one edge to the other edge of the print material 41 at a generally uniform speed along the major scanning direction. It should be noted, however, that the voltage is not applied when the inkjet head 1 resides above a portion of the print material 41 where an ink drop is not to be placed. In this way, an ink drop is placed at a predetermined position. After recording of one scanning cycle completes, the print material 41 is transferred by a predetermined distance along the minor scanning direction by the transfer motor and the transfer rollers 42. Then, ink drops are ejected again while the inkjet head 1 and the carriage 31 are moved along the major scanning direction, whereby recording of another one scanning cycle is performed. This operation is repeated until a desired image is formed over the print material 41.

---Ink Composition---

An ink composition used in the recording apparatus A contains a colorant (dye or pigment), a humectant for suppressing drying of the ink in the nozzle 14 of the inkjet head 1, or the like, a penetrant for enhancing the permeability of the ink (solvent) into the print material 41, water, and a hydrolyzable silane compound that is condensation-polymerized in the absence of the water.

When an ink drop ejected from the nozzle 14 of the inkjet head 1 is adhered onto the print material 41, and the water content (solvent) evaporates or permeates into the print material 41, the hydrolyzable silane compound is condensation-polymerized on the print material 41 to enclose the colorant. Because of this mechanism, even when an image formed with this ink composition on the print material 41 is exposed to water, the colorant is prevented from exuding into the water, and as a result, the water-resistivity of the image is improved.

A preferable hydrolyzable silane compound is a reaction product of hydrolysis of alkoxysilane containing an organic group that has an amino group and alkoxysilane not containing an amino group. Another preferable hydrolyzable silane compound is an organic silicon compound obtained by hydrolysis of a hydrolyzable silane that is produced by reacting an organic monoepoxy compound with a hydrolyzable silane having an amino group and a hydrolyzable silane not containing a nitrogen atom.

The dye may be any type of dye but is preferably a water-soluble acid dye or direct dye.

Preferable pigments are shown below. For example, preferable black pigments include carbon black whose surface is treated with a diazonium salt and carbon black whose surface is treated by graft polymerization of a polymer.

Preferable color pigments include a pigment treated with a surface active agent, such as a formalin condensation product of naphthalene sulfonate, lignin sulfonic acid, dioctylsulfosuccinate, polyoxyethylene alkylamine, aliphatic acid ester, or the like. Specifically, examples of preferable cyan pigments include Pigment Blue 15:3, Pigment Blue 15:4, and aluminum phthalocyanine. Examples of preferable magenta pigments include Pigment Red 122 and Pigment Violet 19. Examples of preferable yellow pigments include Pigment Yellow 74, Pigment Yellow 109, Pigment Yellow 110, and Pigment Yellow 128.

The humectant is desirably a polyhydric alcohol, such as glycerol, or the like, or a water-soluble nitrogen heterocyclic compound, such as 2-pyrrolidone or N-methyl-2-pyrrolidone.

The penetrant is preferably monoalkylether of polyhydric alcohol, such as diethyleneglycol monobutylether, or the like.

It should be noted that the penetrant is not an indispensable constituent of the ink composition of the present invention. However, the surface tension of the ink (or solvent) can be appropriately set by adjusting the content of the penetrant in the ink. With an appropriate setting, the solvent can quickly permeate into the print material 41 after a drop of the ink is adhered onto the print material 41. If the solvent quickly permeates into the print material 41, condensation-polymerization of the silane compound is carried out quickly and sufficiently, and the condensation-polymerized silane compound encloses the colorant quickly and securely. As a result, even immediately after the formation of an image, high-level water-resistivity of the image can be obtained. Furthermore, an anion surfactant or nonionic active agent may be added to the ink composition as an assisting agent for the penetrant.

(Embodiment 1)

An image formation method of embodiment 1 uses a print material 41 whose surface is acidic.

As described above, an ink composition containing a colorant, a humectant, a penetrant, water, and a hydrolyzable silane compound is ejected by the recording apparatus A toward the print material 41, whereby an image is formed on the print material 41.

When the water (solvent) contained in a drop of the ink adhered on the print material 41 evaporates or permeates into the print material 41, the hydrolyzable silane compound begins to be condensation-polymerized. At this step, since the surface of the print material 41 is acidic, the acid on the surface works as a catalyst. Accordingly, the condensation-polymerization of the hydrolyzable silane compound quickly progresses so that the condensation-polymerization reaction is completed. Due to the completion of the condensation-polymerization of the hydrolyzable silane compound, the colorant on the print material 41 is securely enclosed by the silane compound. As a result, even when the image on the print material 41 is exposed to water, the colorant is prevented from exuding into the water, and the water-resistivity of the image is improved.

Specific examples of the print material 41 include plain paper, coated paper, film, etc. Among these examples, plain paper is useful because it is not expensive but can be employed for general purposes. In addition, when the surface of the plain paper is treated to be acidic, an image formed on such an acidic surface exhibits high water-resistivity.

The pH value of the surface of the print material 41 is desirably between 1 and 6. When the pH value of the surface of the print material 41 is higher than 6, an effect of the acid catalyst can hardly be gained. When the pH value of the surface of the print material 41 is lower than 1, the effect of the acid catalyst can be gained. However, in the case of such a low pH value, the acid causes deterioration of the print material 41 itself or deterioration of an element of the recording apparatus A which comes in contact with the print material 41. Thus, the pH value of lower than 1 is impracticable.

It should be noted that the pH value of the surface of the paper can readily be adjusted, for example, by controlling the content of aluminum sulfate that is used as a size fixing agent or by applying an acidic aqueous solution of 0.001 N to 1 N onto neutralized plain paper or acid paper.

According to embodiment 1, as described above, the print material 41 whose surface is acidic and the ink composition containing the water-soluble substance that is condensation-polymerized as water evaporates are used in combination, whereby the water-resistivity of an image which is formed on the print material 41 with the ink composition can be greatly improved.

(Embodiment 2)

In an image formation method of embodiment 2, after an image is formed on the print material 41 with an ink composition, the image is brought into contact with an acid.

As described above, an ink composition containing a colorant, a humectant, a penetrant, water, and a hydrolyzable silane compound is ejected using the recording apparatus A toward the print material 41, whereby an image is formed on the print material 41. When the water (solvent) contained in a drop of the ink adhered on the print material 41 evaporates or permeates into the print material 41, the hydrolyzable silane compound begins to be condensation-polymerized, and the colorant is enclosed by the condensation-polymerized hydrolyzable silane compound.

However, in an actual case, the condensation-polymerization reaction of the hydrolyzable silane compound on the print material 41 is not completed. Since the reaction is not completed, the proportion of the colorant which is enclosed by the hydrolyzable silane compound decreases. Thus, when the image formed on the print material 41 is exposed to water, a portion of the colorant which is not enclosed by the hydrolyzable silane compound exudes into water. This is especially the case when the ink composition containing a magenta dye is used.

According to embodiment 2, after the formation of the image on the print material 41, the image is brought into contact with an acid. Because of a catalytic effect of the acid, the condensation-polymerization of the hydrolyzable silane compound quickly progresses so that the condensation-polymerization reaction is completed. As a result, the colorant on the print material 41 is securely enclosed by the hydrolyzable silane compound, and the water-resistivity of the image is greatly improved.

Examples of a method of bringing the image formed on the print material 41 into contact with an acid include a vapor-phase contact method, a liquid-phase contact method, and a solid-phase contact method. Among these methods, the vapor-phase contact method is practical and preferable because the possibility of adversely affecting the quality of the image is small. Specific examples of the vapor-phase contact method includes the following three methods. According to the first method, the print material 41 on which an image is formed is exposed to an acid vapor which is generated from an acid solution of high concentration contained in a container (e.g., beaker). According to the second method, an acid solution is poured into an airtight container such that the container is filled with an acid vapor, and the print material 41 on which an image is formed is put in the container such that the image is exposed to the acid vapor. According to the third method, the print material 41 on which an image is formed is put in an airtight container, and then, an acid is put in the container to generate an acid vapor, whereby the print material 41 is exposed to the acid vapor.

Examples of the liquid-phase contact method includes the following two methods. According to the first method, an acid solution is put in a container having a size such that the print material 41 can be immersed therein, and then, the print material 41 on which an image is formed is immersed in the acid solution. Immediately after the immersion, the print material 41 is took out from the solution and dried. According to the second method, the acid solution is sprayed over the print material 41 on which an image is formed.

According to an example of the solid-phase contact method, the print material 41 on which an image is formed is brought into contact with silica gel or alumina on which hydrochloric acid, sulfuric acid, phosphoric acid, etc., is adhered.

The acids are desirably an inorganic strong acid, such as hydrochloric acid, sulfuric acid, etc., and a weak acid, such as acetic acid, phosphoric acid, etc.

(Embodiment 3)

In an image formation method of embodiment 3, an image is formed with an ink composition on the print material 41 which has been brought into contact with an acid in advance.

As a method of bringing the print material 41 into contact with an acid in advance, a vapor-phase contact method, a liquid-phase contact method and a solid-phase contact method can be employed. The above-described specific examples of the vapor-phase contact method, the liquid-phase contact method, and the solid-phase contact method can also be employed in embodiment 3. Among these methods, the liquid-phase contact method is preferable because an acid readily permeates into the print material 41.

An ink composition containing a colorant, a humectant, a penetrant, water, and a hydrolyzable silane compound is ejected using the recording apparatus A toward the print material 41 which has been brought into contact with an acid in advance by a vapor-phase, liquid-phase, or solid-phase contact method, whereby an image is formed on the print material 41. When the water (solvent) contained in a drop of the ink adhered on the print material 41 evaporates or permeates into the print material 41, the hydrolyzable silane compound begins to be condensation-polymerized. At this step, the acid in the print material 41 works as a catalyst. Thus, the condensation-polymerization of the hydrolyzable silane compound quickly progresses so that the condensation-polymerization reaction is completed. As a result, the colorant on the print material 41 is securely enclosed by the hydrolyzable silane compound. Accordingly, even when the image is exposed to water, the colorant is prevented from exuding into the water.

Next, specific examples are described for each of embodiments 1–3.

In the first place, an ink composition containing the following constituents was prepared. (It should be noted that the contents of the constituents of the composition are shown in percentage by mass.)

The ink composition contains C.I. Acid Red 289 as a dye, glycerol and diethyleneglycol as humectants, diethyleneglycol monobutylether as a penetrant, and an organic silicon compound as a hydrolyzable silane compound that begins to be condensation-polymerized as water evaporates.

The organic silicon compound was prepared by the following method. A mixture of 100 g (0.56 mol) of $H_2NCH_2CH_2CH_2Si(OCH_3)_3$ and 166 g (1.1 mol) of $Si(OCH_3)_4$ was added to 180 g (10 mol) of water contained in a reactor in a drop-by-drop fashion at room temperature. After all of the mixture was dropped into the water, a resultant solution was stirred at 60° C. for one hour, whereby the organic silicon compound was obtained.

| | |
|---|---|
| C.I. Acid Red 289 | 5% |
| glycerol | 7% |
| diethyleneglycol | 5% |
| diethyleneglycol monobutylether | 5% |
| organic silicon compound | 5% |
| pure water | 73% |

Examples 1-1 to 1-6 were carried out for embodiment 1.

EXAMPLE 1-1

The above ink composition was ejected by the recording apparatus A toward A4-size plain paper whose surface was treated so as to have a pH value of 1, such that a solidly-printed character having a size of 15 mm×15 mm square was formed on the paper.

EXAMPLE 1-2

The printing process described in Example 1-1 was performed using as the print material plain paper whose surface was treated so as to have a pH value of 2.

EXAMPLE 1-3

The printing process described in Example 1-1 was performed using as the print material plain paper (HK Base Paper; produced by Daishowa Paper Manufacturing Co., Ltd.) whose surface was treated so as to have a pH value of 3.

EXAMPLE 1-4

The printing process described in Example 1-1 was performed using as the print material plain paper whose surface was treated so as to have a pH value of 4.

EXAMPLE 1-5

The printing process described in Example 1-1 was performed using as the print material plain paper whose surface was treated so as to have a pH value of 5.

EXAMPLE 1-6

The printing process described in Example 1-1 was performed using as the print material plain paper (Fine Recycled Paper; produced by KISHU PAPER CO., LTD.) whose surface was treated so as to have a pH value of 6.

Examples 2-1 to 2-6 were carried out for embodiment 2. In Examples 2-1 to 2-3, an image (printed character) formed on a print material was brought into contact with the vapor phase of an acid. In Example 2-4, an image formed on a print material was brought into contact with the liquid phase of an acid. In Examples 2-5 and 2-6, an image formed on a print material was brought into contact with the solid phase of an acid.

Printed character samples used in Examples 2-1 and 2-6 were formed by ejecting the above ink composition with the recording apparatus A toward A4-size plain paper (product name: "Xerox4024"; produced by Xerox Co.; pH=6.8) such that the character samples each having a size of 15 mm×15 mm square were solidly-printed on the paper.

EXAMPLE 2-1

Hydrochloric acid of 10 N was poured into an enamel vat to generate a vapor, and the printed side of the paper on which the printed character samples were formed was exposed to the generated vapor of hydrochloric acid at room temperature for 5 minutes.

EXAMPLE 2-2

The process described in Example 2-1 was performed on the printed character sample using nitric acid in place of hydrochloric acid.

EXAMPLE 2-3

Hydrochloric acid of 10 N was poured into an airtight glass container and left as it was at room temperature for one hour so that hydrochloric acid is saturated in the container. The paper on which the printed character samples were formed was placed in the container and left as it was for 5 minutes.

EXAMPLE 2-4

1 ml of hydrochloric acid (0.1 N) was applied using a commercially-available spray generator over the printed side of the paper on which the character samples were formed.

EXAMPLE 2-5

An A4-size glass plate (commercially-available glass plate for thin-layer chromatography) coated with silica microparticles was immersed in hydrochloric acid of 1 N for one minute. Thereafter, the glass plate was took out and dried in air for 5 minutes. Then, the printed character samples were sandwiched between the glass plate coated with the silica microparticles and another glass plate, and the printed side of the paper on which printed character samples were formed was kept in contact for 5 minutes with a face of the glass plate which was coated with the silica particles.

EXAMPLE 2-6

The process described in Example 2-5 was performed on the printed character samples using a glass plate coated with alumina microparticles in place of the glass plate coated with silica microparticles.

Examples 3-1 to 3-6 were carried out for embodiment 3.

EXAMPLE 3-1

A surface of A4-size plain paper (product name: "Xerox4024"; produced by Xerox Co.; pH=6.8) was spray-coated with 1 ml of hydrochloric acid (10 N) and dried in air for 5 minutes. Then, the above-described ink composition was ejected by the recording apparatus A toward the acidic plain paper such that a solidly-printed character having a size of 15 mm×15 mm square was formed on the paper.

EXAMPLE 3-2

The treatment described in Example 3-1 was performed on the plain paper using hydrochloric acid of 1 N as the acid. Then, the above-described ink composition was ejected by the recording apparatus A toward the treated plain paper such that a solidly-printed character having a size of 15 mm×15 mm square was formed on the paper.

EXAMPLE 3-3

The treatment described in Example 3-1 was performed on the plain paper using hydrochloric acid of 0.1 N as the acid. Then, the above-described ink composition was ejected by the recording apparatus A toward the treated plain paper such that a solidly-printed character having a size of 15 mm×15 mm square was formed on the paper.

EXAMPLE 3-4

The treatment described in Example 3-1 was performed on the plain paper using hydrochloric acid of 0.01 N as the acid. Then, the above-described ink composition was ejected by the recording apparatus A toward the treated plain paper such that a solidly-printed character having a size of 15 mm×15 mm square was formed on the paper.

EXAMPLE 3-5

The treatment described in Example 3-1 was performed on the plain paper using nitric acid of 0.1 N as the acid. Then, the above-described ink composition was ejected by the recording apparatus A toward the treated plain paper such that a solidly-printed character having a size of 15 mm×15 mm square was formed on the paper.

EXAMPLE 3-6

A4-size plain paper (product name: "Xerox4024"; produced by Xerox Co.; pH=6.8) was exposed to the vapor of hydrochloric acid of 10 N under the same conditions as those described in Example 2-1. Then, the above-described ink composition was ejected by the recording apparatus A toward the treated plain paper such that a solidly-printed character having a size of 15 mm×15 mm square was formed on the paper.

COMPARATIVE EXAMPLE

The above-described ink composition was ejected by the recording apparatus A toward neutralized plain paper (product name: "Xerox4024"; produced by Xerox Co.; pH=6.8), which was employed as the print material, such that a solidly-printed character having a size of 15 mm×15 mm square was formed on the paper.

The water-resistivity test was performed on the printed character samples formed in the Examples 1-1 to 1-6, 2-1 to 2-6 and 3-1 to 3-6, and Comparative Example. The water-resistivity test was performed in such a manner that the paper having the printed character samples formed thereon was soaked in distilled water for 5 minutes with the printed side down. Evaluation of the water-resistivity is represented by the ratio (%) of the OD value of a printed character sample which was measured after the water-resistivity test to the OD value of the printed character sample which was measured before the water-resistivity test. Specifically, the OD value after the water-resistivity test was measured after the immersion step and a 30-minute air dry step. Results of the water-resistivity test are shown in Table 1.

TABLE 1

| | water-resistivity (%) |
|---|---|
| Example 1-1 | 95 |
| Example 1-2 | 94 |
| Example 1-3 | 93 |
| Example 1-4 | 93 |
| Example 1-5 | 93 |
| Example 1-6 | 93 |
| Example 2-1 | 94 |
| Example 2-2 | 93 |
| Example 2-3 | 93 |
| Example 2-4 | 94 |
| Example 2-5 | 92 |
| Example 2-6 | 92 |
| Example 3-1 | 95 |
| Example 3-2 | 94 |
| Example 3-3 | 93 |
| Example 3-4 | 93 |
| Example 3-5 | 93 |
| Example 3-6 | 92 |
| Comparative Example | 85 |

As seen from Table 1, the samples of Comparative Example has a low water-resistivity of 85%, whereas the water-resistivity of the samples of Examples 1-1 to 1-6, 2-1 to 2-6 and 3-1 to 3-6 is 92% or higher, which is higher than that of Comparative Example by 7–10%.

Furthermore, an image was formed on a print material with a commercially-available printer (product name "EM-930C"; produced by SEIKO EPSON Co.) according to each of the image formation methods of above Examples and Comparative Example. Immediately after formation of the image, the print material was immersed in pure water and then left as it was in a room temperature environment for drying. Thereafter, the print material was checked as to whether or not a bleeding was seen in the image.

In the image formed according to the image formation method of Comparative Example, a bleeding was found at an edge portion of the image. In the image formed according to each of the image formation methods of Examples, a bleeding was hardly found. Thus, it is appreciated that the method of the present invention greatly improves the water-resistivity of the image.

In above Examples, improvement of the water-resistivity was achieved with the magenta dye. It should be noted, however, that improvement of the water-resistivity was also achieved when different types of dyes and pigments were used, although specific examples thereof are not described in this specification.

What is claimed is:

1. An image formation method for forming an image on a print material, comprising the steps of:
   providing (1) an ink composition containing a colorant, a humectant, water, a penetrant, and a water-soluble substance that undergoes a condensation polymerization reaction as the water evaporates, wherein the water-soluble substance comprising a hydrolyzable silane compound; (2) print material; and (3) an acid provided either by a surface of the print material or in or as a separate composition;
   ejecting the ink composition;
   accelerating said condensation polymerization reaction to provide water-resistance to the ink composition by contacting said ink composition with the acid; and
   adhering said ink composition on a surface of the print material.

2. An image formation method according to claim 1, wherein the print material is plain paper.

3. An image formation method according to claim 1, wherein the pH value of the surface of the print material is 1–6.

4. The method according to claim 1, wherein said surface of the print material comprises said acid.

5. The method according to claim 1, wherein said accelerating and said adhering occur concurrently.

6. The method according to claim 1, further comprising a step prior to said adhering, of applying said ink composition to the print surface wherein said contacting of said ink composition occurs prior to said applying.

7. An image formation method which uses an ink composition for inkjet recording, the ink composition containing a colorant, a humectant, water, a penetrant, and a water-soluble substance that undergoes a condensation polymerization reaction as the water evaporates, wherein the water-soluble substance comprising a hydrolyzable silane compound, the method comprising steps of:
   ejecting the ink composition from a nozzle toward a print material to form an image on the print material; and
   after the ejection step, bringing the image formed on the print material into contact with an acid to accelerate said condensation polymerization reaction to provide water-resistance to the ink composition.

8. An image formation method which uses an ink composition for inkjet recording, the ink composition containing a colorant, a humectant, water, a water-soluble substance that begins a condensation polymerization reaction as the water evaporates, and a penetrant, wherein the water-soluble substance comprising a hydrolyzable silane compound, the method comprising steps of:
   bringing a print material into contact with an acid to accelerate said condensation polymerization reaction of the water-soluble substance; and
   after the contact step, ejecting the ink composition from a nozzle toward the print material to form an image on the print material.

9. An image formation method for forming an image on a print material, comprising the steps of:
   ejecting an ink composition containing a colorant, a humectant, water, a penetrant, and a water-soluble substance that undergoes a condensation polymerization reaction as the water evaporates, wherein the water-soluble substance comprising a hydrolyzable silane compound;
   adhering said ink composition onto an acidic surface of the print material; and
   beginning a condensation-polymerization reaction of the water-soluble substance adhered onto the print material and completing the condensation polymerization reaction due to a catalytic effect of an acid accelerating said polymerization reaction.

* * * * *